United States Patent Office 3,263,970
Patented August 2, 1966

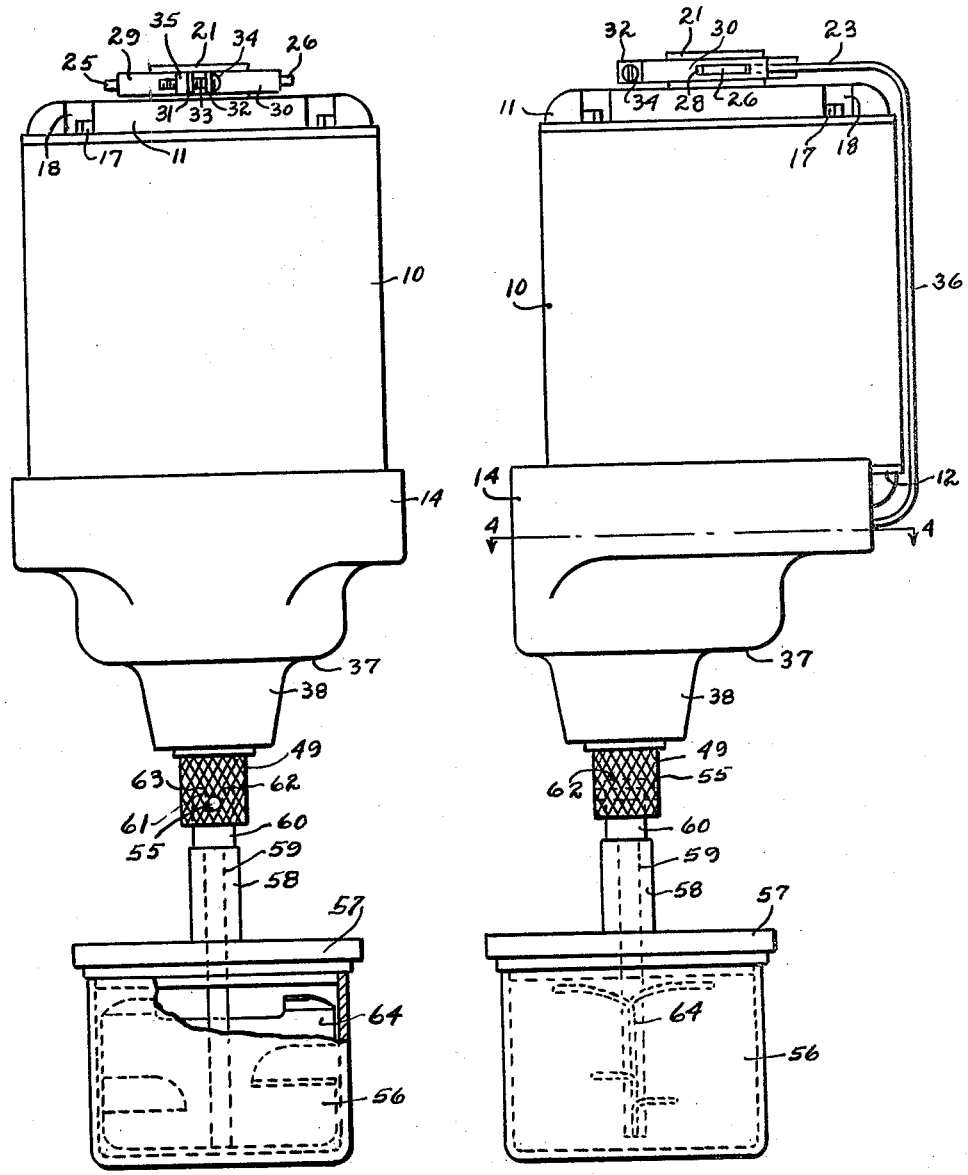

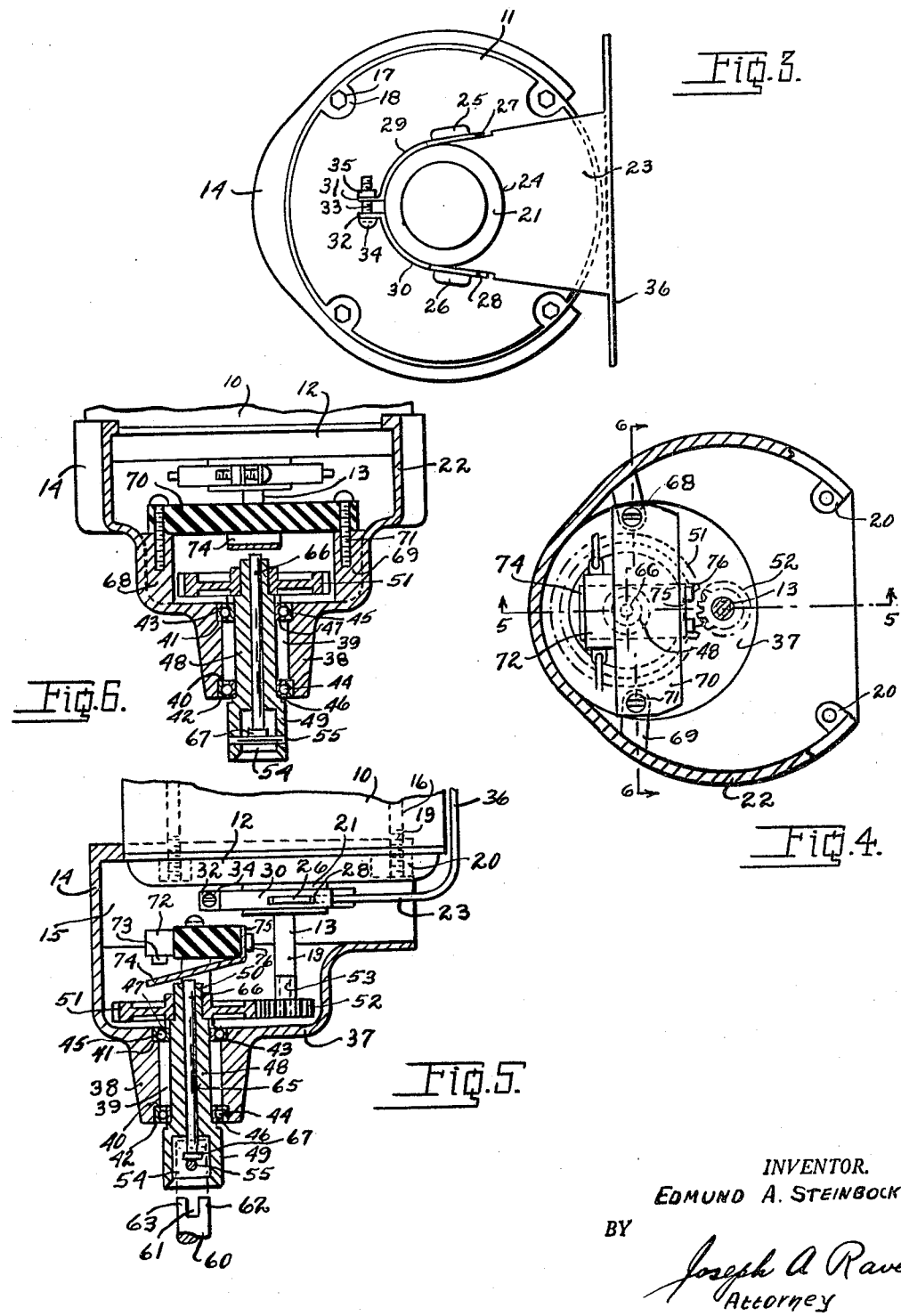

3,263,970
POWER MIXER
Edmund A. Steinbock, Jr., Louisville, Ky., assignor to Whip-Mix Corporation, Inc., Louisville, Ky., a corporation of Kentucky
Filed Nov. 10, 1959, Ser. No. 852,093
5 Claims. (Cl. 259—108)

This invention relates to improvements in a power mixer, that is, a power driven mixing blade for thoroughly mixing materials, such as a mold forming investment.

Power mixers, per se, are old and well known but have generally been in a form in which the parts are arranged with respect to one another and then the power turned on and require, generally, the assembly of said parts, that is, the motor driven driver and the mixer driven member are connected to one another whereupon the power is applied to the motor to effect the operation of the mixer driven member.

Furthermore, with said heretofore known mixers it was necessary to hold the parts in their assembled position with one hand while with the other hand the motor switch was operated and it was then necessary to quickly apply the second hand to the parts to avoid difficulty in mixing as the power motor effected a heavy pull on the operator.

This construction while satisfactory in most instances is somewhat time consuming since the parts must be assembled with respect to one another and held so assembled while the motor is being turned on and which results in a loss of time as well as difficulties in subsequent operation.

By the present invention this loss of time has been eliminated and the assembly of the units made convenient and the mere proper assembling of the parts automatically starts the motor.

The principal object of the present invention is, therefore, the provision of a power mixer which may readily and conveniently be connected, that is, have its power driven driver and mixer driven member readily assembled, and the power automatically turned on.

Another object of the present invention is the provision of a power mixer that accomplishes the foregoing object but which mixer upon the separation of the units automatically disconnects the power from the power driving member so that the said member automatically stops.

A further object of the present invention is the provision of a power mixer for accomplishing the foregoing objects which is economical to produce and acquire.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a front elevational view of a power mixer emboding the principles and construction of the present invention.

FIG. 2 is a side elevational view of the power mixer of the present invention as seen from the right hand side of FIG. 1.

FIG. 3 is a top plan view of the power mixer of FIGS. 1 and 2.

FIG. 4 is a horizontal sectional view through the lower end of the mixer as seen from line 4—4 on FIG. 2.

FIG. 5 is a vertical fragmentary sectional view through a portion of the lower end of the mixer as seen from line 5—5 on FIG. 4.

FIG. 6 is a view similar to FIG. 5 taken at right angles thereto as seen from line 6—6 on FIG. 4.

Throughout the several views of the drawings similar reference characters are employed to denote the same or similar parts.

The power mixer of the present invention utilizes an electric motor 10 of appropriate size and horsepower and which motor includes the usual end plates 11 and 12. The said end plates 11 and 12 provide the bearings for the motor shaft 13, see FIG. 5, utilized, as will presently be made clear, for driving the driven member of the mixer, per se.

The motor 10 has secured thereto, to form a unitary construction therewith, below its end plate 12, a housing 14 substantially cup shaped and having a hollow interior 15. The motor central or body portion along with its end plates 11 and 12 and the housing 14 are connected to one another by means of the usual draw bolts 16 each of which is provided with a head 17 seated at the base of a relieved portion 18 in the top motor plate 11. The lower ends of the said draw bolts are threaded as at 19, see FIG. 5, and respectively are threadedly engaged in a lug 20 inwardly projecting from the wall 22 of the housing 14 and against which lugs the parts are clamped.

The said motor end plates 11 and 12, as noted above, provide the upper and lower bearings for the motor shaft 13 with said bearings each being encircled by a projecting boss 21 of a convenient diameter, and which bosses are employed in mounting the mixer. Since said bosses and the operation thereof are substantially identical with one another it is deemed sufficient if but one of them is described for the other.

As seen in FIG. 3 the upper motor end plate 11 has its boss 21 partially encircled by a bracket arm 23 which includes a semi-circular seat 24 and with said bracket arm laterally of its seat 24 having outwardly projecting lugs 25 and 26. Said lugs 25 and 26, respectively, project through an aperture 27 and 28 respectively formed in segmental straps 29 and 30. Said straps 29 and 30 are formed so as between them to form, substantially, a semi-circle and engage the portion of the bearing boss 21 not engaged by the seat 24 and, as seen most clearly in FIG. 3, said straps 29 and 30 have their free ends formed as outwardly projecting ears, respectively, 31 and 32. The said ears are provided with axially aligned apertures through which projects a clamping bolt 33 having the usual head 34 at one end and engaging the ear 32 and with said bolt 33 having threaded on its other end a nut 35 engaging the strap ear 31.

It is believed obvious from FIG. 3 that by drawing the strap ears 31 and 32 toward one another the bearing boss 21 is forced against the seat 24 and is securely clamped therein by the straps 29 and 30.

A similar bracket arm 23 is respectively at the upper and lower ends of the bracket body portion 36 and which body portion is employed in mounting or securing the motor 10 and housing 14 to a suitable support, generally a vertical support.

The housing 14 is provided with a base 37 from which downwardly projects a boss 38 substantially centrally apertured as at 39 and communicating with the interior 15 of the housing 14. The boss aperture 39 is counterbored from each end thereby providing shoulders 40 and 41 against which is pressed, respectively, the outer races 42 and 43 of ball bearings 44 and 45.

The ball bearings 44 and 45 each has its inner race 46 and 47 on a shaft 48 which extends beyond the opposite ends of the housing boss 38. The portion of the shaft projecting below the said boss 38 is enlarged and may be designated as the shaft driving head 49 while the end of the shaft 48 above the boss 38 and therefore within the interior 15 of the housing 14 is reduced as at 50. Secured to the said reduced portion 50 of the shaft 48 is a gear 51 which upon being secured in position to the shaft 48 secures the said shaft 48 against axial movement in the housing boss 38.

The gear 51 is meshed with a pinion 52 secured in any suitable or desirable manner to the reduced lower end 53 of the motor shaft 13 and through which pinion motion is imparted to the gear 51 and the shaft 48.

The driving head 49 of the shaft 48 is provided upwardly of its lower end with a socket 54 traversed by a pin 55 and which pin acts as the connecting element or key between the said shaft 48 and the said driven element of the mixer, per se.

As seen in FIGS. 1 and 2, the mixer per se, not new in the present application, comprises a cuplike receptacle 56 closed by a lid or cover 57. The lid or cover 57 has upstanding therefrom, and substantially centrally thereof, a bearing sleeve 58 in which is journaled a shaft 59. The shaft 59 has an enlarged upper end 60, projecting above the bearing sleeve 58 and which shaft enlargement 60 is of a diameter substantially equal to the diameter of the driving head socket 54 and which parts are readily telescoped with respect to one another. The shaft head 60 is further provided with a transverse kerf or slot 61 thereby providing driving fingers 62 and 63.

In operation the shaft head 60 is inserted in the socket 54 and with the driving pin 55 thereof received in the slot or kerf 61 with said fingers 62 and 63 respectively on opposite sides of the pin or key 55, thereby providing a keyed or driving connection between the motor unit and mixer unit.

The mixer shaft 59 within the bowl 56 has keyed or otherwise connected thereto a mixing blade or paddle 64 to be rotatively driven within the container 56 by the said motor shaft.

In order to automatically turn on the motor 10 upon insertion of the mixer shaft head 60 into the driving shaft socket 54 the shaft 48 is provided substantially centrally thereof with a bore 65 in which is freely disposed a vertically moveable plunger 66. The plunger 66 is provided at its lower end with an enlarged head 67 which normally rests against the shaft driving head pin or key 55 for thereby limiting the downward gravitations movement of said plunger 66.

Inwardly projecting from the wall 22 of the housing 14 at points above the plunger 66 are mounting lugs 68 and 69 which rigidly support a switch carrier or bridge 70. The said carrier or bridge 70 is preferably made of insulating material and is secured in position by screws 71 passing therethrough into the supporting lugs 68 and 69. The said carrier or bridge 70 has secured to one side thereof a switch 72, designated in the trade as a micro-switch. A movable switch member or actuator 73 downwardly projects from the switch 72 and is yieldably biased to a position where said switch is normally open. Carried by the said switch support or bridge 70 is a leaf spring 74 which is of sufficient length to overlie the upper end of the plunger 66 and underlie the switch actuating or operating member 73. Any suitable means may be employed for mounting the said leaf spring on the bridge 70, that shown in the drawings comprising an upstanding mounting finger 75 at one end thereof secured to the bridge 70 by suitable screws 76.

In operation, the mixer shaft driven head 60 is manually shifted from the solid line position thereof in FIG. 5 upwardly and into the socket 54 to the phantom line position. In the movement of the parts to said operative position the upper ends of the fingers 62 and 63 engage the plunger head 67 and elevate the same for thereby upwardly axially shifting the plunger 66 through the shaft central bore 65 and at the same time shifting the leaf spring 74 from its solid line position to its phantom line position, which is, substantially, in engagement with the lower surface of the switch carrier or bridge 70. The positioning of the leaf spring 74 to said phantom line position operates the switch actuator 73 for thereby connecting the electric circuit, not shown, with the motor 10 and effecting its operation; it being understood that the switch 72 and motor 10 are connected with one another as is usual practice so that the closing of said switch 72 operates the motor 10.

The mixer, per se, is grasped in the hands of the operator when shifting the same to its operative position, such as illustrated by the phantom lines of the driven head 60 in FIG. 5, and the parts are manually held in these positions until the mixing has been completed whereupon a reverse movement of the mixer, that is, the withdrawal of the mixer shaft head 60 from the socket 54 allows the plunger 66 to drop to its lower position relieves the pressure from the leaf spring 74 which returns to its normal downward position, the solid line position thereof in FIG. 5, whereupon the switch actuator 73 is yieldably actuated to its normal position for opening the switch 72 and permitting the motor 10 to stop.

From the foregoing it will now be appreciated that there has been provided a power mixer which accomplishes the objects initially set forth and it will be appreciated that the mere operative connection of the mixer and motor units automatically starts the motor and that the separation of the said units automatically disconnects the current from the motor and permits the same to stop.

What is claimed is:

1. In a power mixer the combination of a motor including a motor housing closed at one end, a motion transmitting housing secured to the closed end of said motor housing to be external thereof, a motor shaft carried by said motor having its one end beyond the motor closed end and within the motion transmitting housing, a driving shaft carried by said motion transmitting housing having one end within the said motion transmitting housing and the other end projecting exteriorly of the motion transmitting housing, motion transmitting means within the housing operatively connecting said motor shaft and dirving shaft for rotating the driving shaft by the motor shaft, said driving shaft exteriorly projecting end having formed therein a socket, a mixing container including a driven mixer shaft having an end adapted to be telescoped with the driving shaft socket, driving means carried by said driving shaft socket, interconnected driven means carried by the driven mixer shaft telescoped end for operatively connecting the same, said mixing container being adapted to be manually held while effecting and during the operative connection of the driving shaft and driven mixer shaft, a normally open control switch for said motor within the motion transmitting housing, said driving shaft having a bore substantially axially thereof upwardly of the socket, an actuator for the switch in alignment with the driving shaft bore, a vertically reciprocal plunger in said driving shaft bore in alignment with the switch actuator normally inoperatively positioned by the driving shaft socket driving means, and means associated with said mixer shaft driven means operative during and after the interconnection of said socket driving and mixer shaft driven means vertically reciprocating the plunger closing the switch and effecting the motor operation.

2. In a power mixer the combination of a motor including a motor housing closed at one end, a motion transmitting housing secured to the closed end of said motor housing to be external thereof, a motor shaft carried by said motor having its one end beyond the motor closed end and within the motion transmitting housing, a driving shaft carried by said motion transmitting housing having one end within the said motion transmitting housing and the other end projecting exteriorly of the motion transmitting housing, motion transmitting means within the housing operatively connecting said motor shaft and driving shaft for rotating the driving shaft by the motor shaft, said driving shaft exteriorly projecting end having formed therein a socket, a mixing container including a driven mixer shaft having an end adapted to be telescoped with the driving shaft socket, a pin transversely of said socket upwardly of its lower end, said driven mixer shaft end having formed transversely thereof a kerf with fingers flanking and upwardly of the kerf, said driving shaft socket pin and mixer driven shaft end kerf being adapted to be operatively associated upon the telescoping thereof, said mixing container being adapted to be manually held while effecting and during the telescoping of the mixer driven shaft kerfed end and driving shaft socket, a normally open control switch for the motor within the motion transmitting housing, said driving shaft having a bore substantially axially thereof upwardly of the socket, an actuator for the switch in alignment with the driving shaft bore, and a vertically reciprocal plunger in said driving shaft bore in alignment with the switch actuator normally inoperatively positioned by the socket transverse pin and said plunger being vertically reciprocated by said mixer driven shaft kerf fingers during and after the operative association of said driving shaft pin and mixer driven shaft kerf for closing the switch and effecting the motor operation.

3. In a power mixer the combination of a motor including a motor housing closed at one end, a motion transmitting housing secured to the closed end of said motor housing to be external thereof, a motor shaft carried by said motor having its one end beyond the motor closed end and within the motion transmitting housing, a driving shaft carried by said motion transmitting housing having one end within the said motion transmitting housing and the other end projecting exteriorly of the motion transmitting housing, motion transmitting means within the housing operatively connecting said motor shaft and driving shaft for rotating the driving shaft by the motor shaft, said driving shaft exteriorly projecting end having formed therein a socket, a mixing container including a driven mixer shaft having an end adapted to be telescoped with the driving shaft socket, a pin transversely of said socket upwardly of its lower end, said driven mixer shaft end having formed transversely thereof a kerf with fingers flanking and upwardly of the kerf, said driving shaft socket pin and mixer driven shaft end kerf being adapted to be operatively associated upon the telescoping thereof, said mixing container being adapted to be manually held while effecting and during the telescoping of the mixer driven shaft kerfed end and driving shaft socket, a normally open control switch for the motor within the motion transmitting housing, said driving shaft having a bore substantially axially thereof upwardly of the socket, an actuator for the switch in alignment with the driving shaft bore, a vertically reciprocal plunger in said driving shaft bore in alignment with the switch actuator normally inoperatively positioned by the socket transverse pin and said plunger being vertically reciprocated by said mixer driven shaft kerf fingers during and after the operative association of said driving shaft pin and mixer driven shaft kerf for closing the switch and effecting the motor operation, and said switch actuator including a leaf spring tensioned by said plunger upon the closing of the switch and operable to return the plunger to its normal position.

4. In a power mixer the combination of a motor including a motor housing closed at one end, a motion transmitting housing secured to the closed end of said motor housing to be external thereof, a motor shaft carried by said motor having an end beyond the motor closed end and within the motion transmitting housing a driven shaft carried by said motion transmitting housing laterally of the motor shaft and having one end within the motion transmitting housing and the other end projecting exteriorly of the said motion transmitting housing, motion transmitting means within the motion transmitting housing operatively connecting said motor and driven shafts for rotation of said driven shaft from the motor shaft, a mixing container including a driven mixer shaft, one of said motion driven shaft and driven mixer shaft having formed therein a socket and the other having a telescoping end adapted to be telescoped with the socket, a pin transversely of one of said socket and telescoping end and the other of said socket and telescoping end having a transverse kerf to receive the pin, said transverse pin being adapted to be disposed in the kerf to operatively associate the same upon the telescoping of the parts, said mixing container being adapted to be manually held while effecting and during the telescoping of the socket and telescoping end, a normally open control switch for the motor within the housing, said driven shaft having a bore substantially axially thereof throughout its length, an actuator for the switch in alignment with the said driven shaft bore, and a vertically reciprocal plunger in said driven shaft bore in alignment with the switch actuator normally inoperatively positioned except when the transverse pin and kerf are operatively associated whereupon said plunger is vertically reciprocated after the operative connection of the transverse pin and kerf for closing the switch and effecting the motor operation.

5. In a power mixer the combination of a motor including a motor housing closed at one end, a motion transmitting housing secured to the closed end of said motor housing to be external thereof, a motor shaft carried by said motor having an end beyond the motor closed end and within the motion transmitting housing, a driven shaft carried by said motion transmitting housing laterally of the motor shaft and having one end within the motion transmitting housing and the other end projecting exteriorly of the said motion transmitting housing, motion transmitting means within the motion transmitting housing operatively connecting said motor and driven shafts for rotation of said driven shaft from the motor shaft, a mixing container including a driven mixer shaft, one of said motion driven shaft and driven mixer shaft having formed therein a socket and the other having a telescoping end adapted to be telescoped with the socket, a pin transversely of one of said socket and telescoping end and the other of said socket and telescoping end having a transverse kerf to receive the pin, said transverse pin being adapted to be disposed in the kerf to operatively associate the same upon the telescoping of the parts, said mixing container being adapted to be manually held while effecting and during the telescoping of the socket and telescoping end, a normally open control switch for the motor within the housing, said driven shaft having a bore substantially axially thereof throughout its length, an actuator for the switch in alignment with the said driven shaft bore, a vertically reciprocal plunger in said driven shaft bore in alignment with the switch actuator normally inoperatively positioned except when the transverse pin and kerf are operatively associated whereupon said plunger is vertically reciprocated after the operative connection of the transverse pin and kerf for closing the switch and effecting the motor operation, and said switch actuator including spring means tensioned by said plunger upon the closing of the switch and operable to return the plunger to its normal inoperative position.

References Cited by the Examiner
UNITED STATES PATENTS

| | | | |
|---|---|---|---|
| 2,113,025 | 4/1938 | Jeppsson | 259—102 X |
| 2,699,925 | 1/1955 | Madl | 259—108 |
| 2,710,743 | 6/1955 | Betry | 259—108 |
| 2,757,910 | 8/1956 | O'Neill | 259—108 |
| 2,777,177 | 1/1957 | Steinbock. | |
| 2,821,905 | 2/1958 | Culligan | 200—61.59 |

WILLIAM I. PRICE, *Primary Examiner.*

HORACE A. BERMAN, HESTER MARTIN, JAMES SHANK, NELSON ELLISON, WALTER A. SCHEEL, CHARLES WILLMUTH, *Examiners.*

RONALD R. WEAVER, J. A. COOKE,
*Assistant Examiners.*